United States Patent
Vasseur et al.

(10) Patent No.: US 10,119,007 B2
(45) Date of Patent: Nov. 6, 2018

(54) TREAD OF A TIRE WITH IMPROVED GRIP ON WET GROUND

(75) Inventors: Didier Vasseur, Clermont-Ferrand (FR); Philippe Labrunie, Clermont-Ferrand (FR); Xavier Saintigny, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 13/988,709

(22) PCT Filed: Nov. 24, 2011

(86) PCT No.: PCT/EP2011/070930
§ 371 (c)(1),
(2), (4) Date: Jun. 26, 2013

(87) PCT Pub. No.: WO2012/069585
PCT Pub. Date: May 31, 2012

(65) Prior Publication Data
US 2013/0274404 A1   Oct. 17, 2013

(30) Foreign Application Priority Data
Nov. 26, 2010   (FR) ..................... 10 59785

(51) Int. Cl.
| | | |
|---|---|---|
| *B60C 1/00* | (2006.01) | |
| *C08K 5/09* | (2006.01) | |
| *C08K 3/36* | (2006.01) | |
| *C08K 3/04* | (2006.01) | |
| *C08K 3/06* | (2006.01) | |
| *C08K 3/22* | (2006.01) | |
| *C08K 5/18* | (2006.01) | |
| *C08K 5/31* | (2006.01) | |
| *C08K 5/47* | (2006.01) | |
| *C08L 9/06* | (2006.01) | |
| *C08L 45/00* | (2006.01) | |
| *C08L 47/00* | (2006.01) | |
| *C08L 9/00* | (2006.01) | |
| *C08L 91/00* | (2006.01) | |

(52) U.S. Cl.
CPC .............. *C08K 3/36* (2013.01); *B60C 1/0016* (2013.01); *C08K 3/04* (2013.01); *C08K 3/06* (2013.01); *C08K 3/22* (2013.01); *C08K 5/09* (2013.01); *C08K 5/18* (2013.01); *C08K 5/31* (2013.01); *C08K 5/47* (2013.01); *C08L 9/00* (2013.01); *C08L 9/06* (2013.01); *C08L 91/00* (2013.01); *C08L 45/00* (2013.01); *C08L 47/00* (2013.01)

(58) Field of Classification Search
CPC ...... B60C 1/0016; C08K 5/09; C08K 5/0016; C08K 3/36; C08K 3/34; C08K 3/04; C08K 3/06; C08K 3/22; C08K 5/18; C08K 5/31; C08K 5/47; C08L 9/06; C08L 7/00; C08L 45/00; C08L 47/00; C08L 2666/04; C08L 2666/08; C08L 9/00; C08L 91/00
USPC ........................................................ 524/525
See application file for complete search history.

(56) References Cited

U.S. PATENT DOCUMENTS

| | | | |
|---|---|---|---|
| 4,229,333 A | 10/1980 | Wolff et al. | ............ 260/23.7 M |
| 5,227,425 A | 7/1993 | Rauline | ........................ 524/493 |
| 5,409,969 A | 4/1995 | Hamada | ........................ 523/213 |
| 5,455,624 A | 10/1995 | Ishibe et al. | |
| 5,508,333 A | 4/1996 | Shimizu | ........................ 524/424 |
| 5,852,099 A | 12/1998 | Vanel | ............................. 524/494 |
| 5,900,449 A | 5/1999 | Custodero et al. | ........... 524/430 |
| 5,925,713 A | 7/1999 | Labauze | ........................ 524/572 |
| 5,965,661 A | 10/1999 | du Bois et al. | ............ 524/575.5 |
| 5,977,238 A | 11/1999 | Labauze | ........................ 524/492 |
| 6,008,295 A | 12/1999 | Takeichi et al. | ............... 525/105 |
| 6,013,718 A | 1/2000 | Cabioch et al. | .............. 524/506 |
| 6,071,995 A | 6/2000 | Labauze | ........................ 524/269 |
| 6,201,059 B1 | 3/2001 | Wideman et al. | ............ 524/518 |
| 6,204,322 B1 | 3/2001 | Labauze | ........................ 524/572 |
| 6,214,919 B1 | 4/2001 | Schlademan et al. | ........ 524/492 |

(Continued)

FOREIGN PATENT DOCUMENTS

| | | |
|---|---|---|
| AU | 3016095 A | 3/1996 |
| DE | 10 2008 026 351 A1 | 12/2009 |

(Continued)

OTHER PUBLICATIONS

S. Otto, et al., "New Reference Value for the Description of Filler Dispersion with the Dispergrader 1000 NT", KGK Kautschuk Gummi Kunststoffe 58, Jahrgang, Nr. 7-8/2005, pp. 390-393.

(Continued)

*Primary Examiner* — Angela C Scott
(74) *Attorney, Agent, or Firm* — Fitzpatrick, Cella, Harper & Scinto

(57) ABSTRACT

A tire, which has an improved grip on wet ground, includes a tread formed of at least a rubber composition. The rubber composition includes: from 50 to 100 phr of a copolymer based on styrene and butadiene, e.g., a styrene/butadiene copolymer (SBR), with phr referring to parts by weight per hundred parts of elastomer; from 100 to 150 phr of a reinforcing inorganic filler, e.g., silica; and a plasticizing system. The plasticizing system includes: a content A of between 10 and 60 phr of a thermoplastic hydrocarbon resin exhibiting a Tg of greater than 20° C.; and a content B of between 10 and 60 phr of a liquid plasticizing agent. A total content A+B is greater than 50 phr. Optionally, the rubber composition includes from 0 to 50 phr of another copolymer, e.g., a diene elastomer such as a polybutadiene or natural rubber.

60 Claims, No Drawings

(56) References Cited

U.S. PATENT DOCUMENTS

| | | | |
|---|---|---|---|
| 6,228,944 B1 | 5/2001 | Blok et al. | 525/210 |
| 6,265,478 B1 | 7/2001 | Kralevich, Jr. et al. | 524/518 |
| 6,316,567 B1 | 11/2001 | Kralevich, Jr. et al. | 526/283 |
| 6,329,457 B1 | 12/2001 | Datta et al. | 524/270 |
| 6,344,518 B1 | 2/2002 | Kobayashi et al. | 524/862 |
| 6,348,539 B1 | 2/2002 | Wideman et al. | 524/518 |
| 6,357,499 B1 | 3/2002 | Kralevich, Jr. et al. | 152/209.1 |
| 6,420,488 B1 | 7/2002 | Penot | 525/332.7 |
| 6,503,973 B2 | 1/2003 | Robert et al. | 524/492 |
| 6,512,036 B2 | 1/2003 | Wideman et al. | 524/311 |
| 6,536,492 B2 | 3/2003 | Vasseur | 152/450 |
| 6,774,255 B1 | 8/2004 | Tardivat et al. | 556/427 |
| 6,815,473 B2 | 11/2004 | Robert et al. | 523/215 |
| 6,849,754 B2 | 2/2005 | Deschler et al. | 556/427 |
| 7,071,251 B2 | 7/2006 | Thielen et al. | 524/47 |
| 7,119,147 B2 | 10/2006 | Kikuchi | |
| 7,199,175 B2 | 4/2007 | Vasseur | 524/492 |
| 7,217,751 B2 | 5/2007 | Durel et al. | 524/262 |
| 7,250,463 B2 | 7/2007 | Durel et al. | 524/492 |
| 7,253,225 B2 | 8/2007 | Labauze et al. | 524/313 |
| 7,259,205 B1 | 8/2007 | Pagliarini et al. | 524/493 |
| 7,300,970 B2 | 11/2007 | Durel et al. | 524/493 |
| 7,312,264 B2 | 12/2007 | Gandon-Pain | 524/236 |
| 7,335,692 B2 | 2/2008 | Vasseur et al. | 524/312 |
| 7,432,318 B2 | 10/2008 | Kikuchi | |
| 7,488,768 B2 | 2/2009 | Tardivat et al. | 524/262 |
| 7,491,767 B2 | 2/2009 | Durel et al. | 524/493 |
| 7,588,065 B2 | 9/2009 | Serre | |
| 7,629,408 B2 | 12/2009 | Cambon et al. | 524/492 |
| 7,671,128 B1 | 3/2010 | Thielen et al. | 524/526 |
| 7,671,132 B2 | 3/2010 | Thielen et al. | 525/191 |
| 7,709,561 B2 | 5/2010 | Ohashi et al. | |
| 7,820,771 B2 | 10/2010 | Lapra et al. | 525/479 |
| 7,829,621 B2 | 11/2010 | Kunisawa et al. | 524/482 |
| 7,834,074 B2 | 11/2010 | Brunelet et al. | 524/318 |
| 7,900,667 B2 | 3/2011 | Vasseur | 152/209.1 |
| 7,981,966 B2 | 7/2011 | Kobayashi et al. | 525/237 |
| 7,999,029 B2 | 8/2011 | Yan et al. | 524/528 |
| 8,178,605 B2 | 5/2012 | Lopitaux et al. | 524/306 |
| 8,236,888 B2 | 8/2012 | Yan et al. | 524/528 |
| 8,318,861 B2 | 11/2012 | Houjo et al. | |
| 8,324,310 B2 | 12/2012 | Robert et al. | 524/518 |
| 8,344,063 B2 | 1/2013 | Marechal et al. | 524/571 |
| 8,362,118 B2 | 1/2013 | Mihara | 524/77 |
| 8,389,612 B2 | 3/2013 | Miyazaki | 524/331 |
| 8,404,766 B2 | 3/2013 | Miyazaki | 524/331 |
| 8,637,597 B2 | 1/2014 | Lopitaux | |
| 8,815,995 B2 | 8/2014 | Vest et al. | B60C 1/0016 |
| 9,040,613 B2 | 5/2015 | Lopitaux et al. | C08K 5/12 |
| 2001/0016636 A1 | 8/2001 | Wideman et al. | 526/283 |
| 2002/0068781 A1 | 6/2002 | Serre | |
| 2002/0143086 A1 | 10/2002 | Wideman et al. | 524/306 |
| 2004/0092644 A1 | 5/2004 | Labauze | 524/492 |
| 2004/0122157 A1 | 6/2004 | Labauze | 524/487 |
| 2004/0127617 A1 | 7/2004 | Vasseur et al. | 524/318 |
| 2004/0211111 A1 | 10/2004 | Kikuchi | |
| 2005/0148713 A1 | 7/2005 | Labauze et al. | 524/311 |
| 2005/0171260 A1 | 8/2005 | Kikuchi | |
| 2005/0171267 A1 | 8/2005 | Zanzig et al. | 524/492 |
| 2005/0209413 A1 | 9/2005 | Labauze et al. | 525/333.3 |
| 2006/0089445 A1 | 4/2006 | Gandon-Pain | 524/492 |
| 2006/0094815 A1 | 5/2006 | Kunisawa et al. | 524/496 |
| 2006/0116457 A1 | 6/2006 | Cambon et al. | 524/261 |
| 2006/0167160 A1 | 7/2006 | Nakagawa et al. | 524/442 |
| 2006/0167163 A1 | 7/2006 | Ohashi et al. | |
| 2007/0175557 A1 | 8/2007 | Puhala et al. | 152/209.5 |
| 2007/0185267 A1 | 8/2007 | Kobayashi et al. | 525/191 |
| 2007/0293619 A1 | 12/2007 | Jacoby et al. | 524/493 |
| 2008/0156404 A1 | 7/2008 | Brunelet et al. | 152/209.1 |
| 2008/0251174 A1 | 10/2008 | Romani et al. | 152/209.1 |
| 2008/0319125 A1 | 12/2008 | Boswell et al. | 524/543 |
| 2009/0093593 A1 | 4/2009 | Kato et al. | 525/275 |
| 2009/0186961 A1 | 7/2009 | Araujo Da Silva et al. | 523/150 |
| 2009/0209709 A1 | 8/2009 | Arauja Da Silva et al. | 525/333.1 |
| 2009/0234066 A1 | 9/2009 | Araujo Da Silva et al. | 524/571 |
| 2009/0270558 A1 | 10/2009 | Gandon-Pain et al. | 525/190 |
| 2009/0292063 A1 | 11/2009 | Robert et al. | 524/518 |
| 2009/0294012 A1 | 12/2009 | Serre | |
| 2010/0022714 A1 | 1/2010 | Varagniat et al. | 525/209 |
| 2010/0025627 A1 | 2/2010 | Naoi et al. | |
| 2010/0036019 A1 | 2/2010 | Miyazaki | 523/157 |
| 2010/0099796 A1 | 4/2010 | Lopitaux et al. | 523/156 |
| 2010/0113703 A1 | 5/2010 | Houjo et al. | 525/232 |
| 2010/0145089 A1 | 6/2010 | Mignani et al. | 556/429 |
| 2010/0179247 A1 | 7/2010 | Vest et al. | 523/150 |
| 2010/0184912 A1 | 7/2010 | Marechal et al. | 524/571 |
| 2010/0204358 A1 | 8/2010 | Lopitaux | 523/152 |
| 2010/0204372 A1 | 8/2010 | Miyazaki | 524/104 |
| 2010/0216935 A1 | 8/2010 | Boswell et al. | 524/543 |
| 2010/0249270 A1 | 9/2010 | Robert et al. | 523/150 |
| 2010/0252156 A1 | 10/2010 | Robert et al. | 152/209.1 |
| 2010/0292366 A1 | 11/2010 | Herzog et al. | 523/150 |
| 2010/0300593 A1 | 12/2010 | Merino Lopez et al. | 152/504 |
| 2011/0021702 A1 | 1/2011 | Gandon-Pain et al. | 525/55 |
| 2011/0040002 A1 | 2/2011 | Lopitaux et al. | 524/295 |
| 2011/0061782 A1 | 3/2011 | Merino Lopez et al. | 152/503 |
| 2011/0144236 A1 | 6/2011 | Mihara | 523/158 |
| 2011/0152458 A1 | 6/2011 | Araujo Da Silva et al. | 525/102 |
| 2011/0178233 A1 | 7/2011 | Chaboche et al. | 524/571 |
| 2011/0184084 A1 | 7/2011 | Katou | 523/156 |
| 2011/0190416 A1 | 8/2011 | Maesaka et al. | 523/155 |
| 2011/0294953 A1 | 12/2011 | Seeboth et al. | 525/102 |
| 2011/0319646 A1 | 12/2011 | Boswell et al. | 556/428 |
| 2012/0095153 A1 | 4/2012 | Tokimune et al. | 524/526 |
| 2012/0208948 A1 | 8/2012 | Gandon-Pain et al. | 524/521 |
| 2012/0245270 A1 | 9/2012 | Blanchard et al. | 524/388 |
| 2013/0005894 A1 | 1/2013 | Lopitaux et al. | 524/432 |
| 2013/0267640 A1 | 10/2013 | Lopez et al. | 524/322 |
| 2013/0296471 A1 | 11/2013 | Lesage et al. | 524/322 |
| 2013/0299053 A1 | 11/2013 | Fugier et al. | 152/209.8 |

FOREIGN PATENT DOCUMENTS

| | | | |
|---|---|---|---|
| DE | 10 2008 037 593 A1 | 5/2010 | |
| EP | 0 341 496 A2 | 11/1989 | |
| EP | 0 501 227 A1 | 9/1992 | |
| EP | 0 590 490 A1 | 4/1994 | |
| EP | 0 626 278 A1 | 11/1994 | |
| EP | 0 692 492 A1 | 1/1996 | |
| EP | 0 735 088 A1 | 10/1996 | |
| EP | 0 778 311 A1 | 6/1997 | |
| EP | 0 795 581 A1 | 9/1997 | |
| EP | 0 810 258 A1 | 12/1997 | |
| EP | 0 877 047 A1 | 11/1998 | |
| EP | 0 890 607 A1 | 1/1999 | |
| EP | 1 000 970 A1 | 5/2000 | |
| EP | 1 028 130 A1 | 8/2000 | |
| EP | 1 029 873 A1 | 8/2000 | |
| EP | 1 029 874 A1 | 8/2000 | |
| EP | 1028007 A1 | 8/2000 | |
| EP | 1 050 547 A1 | 11/2000 | |
| EP | 1 074 582 A1 | 2/2001 | |
| EP | 1 077 223 A1 | 2/2001 | |
| EP | 1 077 229 A1 | 2/2001 | |
| EP | 1 127 909 A1 | 8/2001 | |
| EP | 1 227 125 A1 | 7/2002 | |
| EP | 1 293 530 A2 | 3/2003 | |
| EP | 1 312 639 A1 | 5/2003 | |
| EP | 1329478 A1 | 7/2003 | |
| EP | 1 400 559 A1 | 3/2004 | |
| EP | 1 400 560 A1 | 3/2004 | |
| EP | 1 431 075 A1 | 6/2004 | |
| EP | 1 457 501 A1 | 9/2004 | |
| EP | 1 514 900 A1 | 3/2005 | |
| EP | 1559585 A1 | 8/2005 | |
| EP | 1561780 A1 | 8/2005 | |
| EP | 1 621 579 A1 | 2/2006 | |
| EP | 1648960 B1 | 4/2006 | |
| EP | 1 652 878 A1 | 5/2006 | |

(56) References Cited

FOREIGN PATENT DOCUMENTS

| | | |
|---|---|---|
| EP | 1676882 A1 | 7/2006 |
| EP | 1 721 930 A1 | 11/2006 |
| EP | 1818188 A1 | 8/2007 |
| EP | 1 829 934 A1 | 9/2007 |
| EP | 1 911 797 A1 | 4/2008 |
| EP | 2 060 604 A1 | 5/2009 |
| EP | 2 070 952 A1 | 6/2009 |
| EP | 2103650 A1 | 9/2009 |
| EP | 2104705 B1 | 9/2009 |
| EP | 2150422 B1 | 2/2010 |
| EP | 2 159 074 A1 | 3/2010 |
| EP | 2204406 A1 | 7/2010 |
| EP | 2239296 A1 | 10/2010 |
| EP | 2643403 A1 | 10/2013 |
| FR | 2 740 778 A1 | 5/1997 |
| FR | 2 765 882 A1 | 1/1999 |
| JP | 55-60539 A | 5/1980 |
| JP | 59-15940 B2 | 4/1984 |
| JP | 60-179434 A | 9/1985 |
| JP | 62-227908 | 6/1987 |
| JP | 63-215701 | 8/1988 |
| JP | 63-314255 A | 12/1988 |
| JP | 5-214170 A | 8/1993 |
| JP | 6-240052 A | 8/1994 |
| JP | 6-248117 A | 9/1994 |
| JP | 7-70370 A | 3/1995 |
| JP | 7-90124 A | 4/1995 |
| JP | 7-133377 A | 5/1995 |
| JP | H08-59924 A | 3/1996 |
| JP | 9-136996 A | 5/1997 |
| JP | 9-143312 A | 6/1997 |
| JP | 9-165471 A | 6/1997 |
| JP | 9-208621 A | 8/1997 |
| JP | 9-208632 A | 8/1997 |
| JP | 9-208748 A | 8/1997 |
| JP | H09-302146 A | 11/1997 |
| JP | 10-53003 A | 2/1998 |
| JP | 10-501291 A | 2/1998 |
| JP | 10-204216 | 8/1998 |
| JP | 10-237224 A | 9/1998 |
| JP | 11-29656 A | 2/1999 |
| JP | 11-49894 A | 2/1999 |
| JP | 11-228647 A | 8/1999 |
| JP | 2000-52707 A | 2/2000 |
| JP | 2000-204274 A | 7/2000 |
| JP | 2000-230080 A | 8/2000 |
| JP | 2000-230081 A | 8/2000 |
| JP | 2000-233454 A | 8/2000 |
| JP | 2000-239448 A | 9/2000 |
| JP | 2000-256515 A | 9/2000 |
| JP | 2000-344839 A | 12/2000 |
| JP | 2001-11240 A | 1/2001 |
| JP | 2001-26622 A | 1/2001 |
| JP | 2001-89597 A | 4/2001 |
| JP | 2001-98036 A | 4/2001 |
| JP | 2001-348461 A | 12/2001 |
| JP | 2002-20542 A | 1/2002 |
| JP | 2002-114874 A | 4/2002 |
| JP | 2002-226629 A | 8/2002 |
| JP | 2002-284934 A | 10/2002 |
| JP | 2003-155398 A | 5/2003 |
| JP | 2003-213039 A | 7/2003 |
| JP | 2003-253051 A | 9/2003 |
| JP | 2004-137463 A | 5/2004 |
| JP | 2004-161958 A | 6/2004 |
| JP | 2004-518806 A | 6/2004 |
| JP | 2004-518807 A | 6/2004 |
| JP | 2004-519551 | 7/2004 |
| JP | 2005-213415 A | 8/2005 |
| JP | 2005-213508 A | 8/2005 |
| JP | 2005-220251 A | 8/2005 |
| JP | 2005-263905 A | 9/2005 |
| JP | 2005-307166 A | 11/2005 |
| JP | 2005-534759 A | 11/2005 |
| JP | 2005-537369 A | 12/2005 |
| JP | 2006-124601 A | 5/2006 |
| JP | 2006-249188 A | 9/2006 |
| JP | 2006-249230 A | 9/2006 |
| JP | 2006-282830 A | 10/2006 |
| JP | 2006-306962 A | 11/2006 |
| JP | 2006-306965 A | 11/2006 |
| JP | 2006-307096 A | 11/2006 |
| JP | 2006-528253 A | 12/2006 |
| JP | 2007-70451 A | 3/2007 |
| JP | 2007-77374 A | 3/2007 |
| JP | 2007-161819 A | 6/2007 |
| JP | 2007-522299 | 8/2007 |
| JP | 2007-262206 A | 10/2007 |
| JP | 2007-262292 A | 10/2007 |
| JP | 2007-277307 A | 10/2007 |
| JP | 2007-321046 A | 12/2007 |
| JP | 2007-332246 A | 12/2007 |
| JP | 2008-1747 A | 1/2008 |
| JP | 2008-1900 A | 1/2008 |
| JP | 2008-88425 A | 4/2008 |
| JP | 2008-169296 A | 7/2008 |
| JP | 2008-169298 A | 7/2008 |
| JP | 2008-174664 A | 7/2008 |
| JP | 2008-174688 A | 7/2008 |
| JP | 2008-174696 A | 7/2008 |
| JP | 2008-525537 A | 7/2008 |
| JP | 2008-184505 A | 8/2008 |
| JP | 2008-189725 A | 8/2008 |
| JP | 2008-201933 A | 9/2008 |
| JP | 2008-208265 A | 9/2008 |
| JP | 2008-214590 A | 9/2008 |
| JP | 2008-231209 A | 10/2008 |
| JP | 2008-248203 A | 10/2008 |
| JP | 2008-274017 A | 11/2008 |
| JP | 2008-274207 A | 11/2008 |
| JP | 2009-001721 A | 1/2009 |
| JP | 2009-504810 A | 2/2009 |
| JP | 2009-62485 A | 3/2009 |
| JP | 2009-102506 A | 5/2009 |
| JP | 2009-114262 A | 5/2009 |
| JP | 2009-114427 A | 5/2009 |
| JP | 2009-120845 A | 6/2009 |
| JP | 2009-144175 A | 7/2009 |
| JP | 2009-166519 A | 7/2009 |
| JP | 2009-263456 A | 11/2009 |
| JP | 2009-263587 A | 11/2009 |
| JP | 2009-298920 A | 12/2009 |
| JP | 2010-59398 A | 3/2010 |
| JP | 2010-116557 A | 5/2010 |
| JP | 2010-514860 A | 5/2010 |
| JP | 2010-514861 A | 5/2010 |
| JP | 2010-126672 A | 6/2010 |
| JP | 2010-155935 A | 7/2010 |
| JP | 2010-522800 A | 7/2010 |
| JP | 2010-525087 A | 7/2010 |
| JP | 2010-168491 A | 8/2010 |
| JP | 2010-526923 A | 8/2010 |
| JP | 2010-526924 A | 8/2010 |
| JP | 2010-209174 A | 9/2010 |
| JP | 2010-209197 A | 9/2010 |
| JP | 2010-229253 A | 10/2010 |
| JP | 2010-235663 A | 10/2010 |
| JP | 2010-241965 A | 10/2010 |
| JP | 2011-122057 A | 6/2011 |
| JP | 5909756 B2 | 4/2016 |
| WO | 95/34601 A1 | 12/1995 |
| WO | WO 96/37547 A2 | 11/1996 |
| WO | WO 97/36724 | 10/1997 |
| WO | WO 99/09036 A1 | 2/1999 |
| WO | WO 99/16600 | 4/1999 |
| WO | WO 99/928380 A1 | 6/1999 |
| WO | WO 00/05300 A1 | 2/2000 |
| WO | WO 00/05301 A1 | 2/2000 |
| WO | WO 01/92402 A1 | 12/2001 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 02/088238 A1 | 11/2002 |

(56) References Cited

FOREIGN PATENT DOCUMENTS

| | | |
|---|---|---|
| WO | WO 03/002648 A1 | 1/2003 |
| WO | WO 03/002649 A1 | 1/2003 |
| WO | WO 03/016387 A1 | 2/2003 |
| WO | WO 2004/096865 A2 | 11/2004 |
| WO | WO 2004/111094 A1 | 12/2004 |
| WO | 2005/056615 A1 | 6/2005 |
| WO | 2005/085343 A1 | 9/2005 |
| WO | WO 2006/023815 A2 | 3/2006 |
| WO | WO 2006/050486 A1 | 5/2006 |
| WO | 2006/066615 | 6/2006 |
| WO | WO 2006/069792 A1 | 7/2006 |
| WO | WO 2006/069793 A1 | 7/2006 |
| WO | WO 2006/076629 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/061550 A1 | 5/2007 |
| WO | WO 2007/098080 A2 | 8/2007 |
| WO | WO 2008/003434 A1 | 1/2008 |
| WO | WO 2008/003435 A1 | 1/2008 |
| WO | WO 2008/055986 A2 | 5/2008 |
| WO | WO 2008/141702 A1 | 11/2008 |
| WO | WO 2009/000750 A1 | 12/2008 |
| WO | WO 2009/000752 A1 | 12/2008 |
| WO | WO 2009/125747 A1 | 10/2009 |
| WO | WO 2009/133068 A1 | 11/2009 |
| WO | 2010/009850 A1 | 1/2010 |
| WO | WO 2010/072685 A1 | 7/2010 |
| WO | 2010/116988 A1 | 10/2010 |

OTHER PUBLICATIONS

Rubber Term Glossary, Japan, Society of Rubber Science and Technology, Jul. 10, 1978, 1st Edition, pp. 124-125 with partial English translation (2 pages).

Office Action dated Mar. 24, 2016, in corresponding JP Application No. 2013-540362 with English translation (13 pages).

Written Opposition dated Jun. 24, 2016, in Japanese Patent No. 5837086, English translation (153 pages).

U.S. Appl. No. 13/641,564, filed May 2, 2011.

U.S. Appl. No. 13/988,699, filed Nov. 24, 2011.

U.S. Appl. No. 13/988,703, filed Nov. 24, 2011.

R. Mildenberg, et al.; Hydrocarbon Resins, VCH, New York, Chapter 5, pp. 141-146 (1997).

Z.Q. Liu, et al., "Effects of Glycerin and Glycerol Monostearate on Performance of Thermoplastic Starch," J. Mater. Sci., vol. 36, No. 7, pp. 1809-1815 (2001).

A. Yasui, "Application of Highly Hydrogenated Terpene Phenolic Resin to Electronic Materia", Journal of the Society of Rubber Industry, Japan, vol. 80, No. 1, pp. 19-24 (2007).

"Measurement of thermal denaturation temperature of natural polymer by thermal analysis," Technical Information by Hokkaido Industrial Research Institute, vol. 28 (110th volumes), No. 4, 1 page (2006).

"Progress of rubber for tyre; silica-containing tyre for low fuel consumption", Network Polymer, vol. 33, No. 5, pp. 242-248 (2012).

"Rubber and filler," Japan Rubber Association Journal, vol. 71, No. 9, pp. 583-587 (1998).

"Silica reinforced polymer in view of recent patents," Japan Rubber Association Journal, vol. 71, No. 9, pp. 562-570 (1998).

"Comparison of carbon and silica in tread composition," Japan Rubber Association Journal, vol. 72, No. 7, pp. 697-700 (1999).

"Relation between basic property and performance of carbon black," Japan Rubber Association Journal, vol. 58, No. 10, pp. 644-657 (1985).

"Dictionary of rubber," Asakura Book Store, first edition, second printing, pp. 280-283 (2004).

"New edition Basis of rubber technology," Japan Rubber Association, pp. 146-149, 197-201 and 208-213 (1999).

"Poval," available at: <http://www.kuraray.co.jp/products/question/plastidpoval.html> Accessed on Dec. 15, 2017.

TREAD OF A TIRE WITH IMPROVED GRIP ON WET GROUND

FIELD OF THE INVENTION

The field of the invention is that of rubber compositions for tyres, more specifically rubber compositions for treads.

BACKGROUND

A tyre tread has to meet, in a known way, a large number of often conflicting technical requirements, including a low rolling resistance, a high wear resistance, a high dry grip and a high wet grip.

These compromises in properties, in particular from the viewpoint of the rolling resistance and the wear resistance, have been able to be improved in recent years with regard to energy-saving "Green Tyres", intended in particular for passenger vehicles, by virtue in particular of the use of novel low-hysteresis rubber compositions having the characteristic of being reinforced predominantly by reinforcing inorganic fillers, in particular by highly dispersible silicas, capable of rivalling, from the viewpoint of the reinforcing power, conventional tyre-grade carbon blacks.

However, improving the grip properties, in particular the wet grip properties, remains a constant concern of tyre designers.

BRIEF DESCRIPTION OF THE INVENTION

On continuing their research studies, the Applicant Companies have discovered that the use of a copolymer based on styrene and butadiene, according to a content of 50 to 100 phr, of a particularly high content of reinforcing inorganic filler combined with a specific plasticizing system makes it possible to further improve the wet grip performance of these tyres having a low rolling resistance.

Thus, a subject-matter of the invention is a tyre, the tread of which comprises a rubber composition comprising at least:
  from 50 to 100 phr of a copolymer based on styrene and butadiene;
  optionally from 0 to 50 phr of another diene elastomer;
  from 100 to 150 phr of a reinforcing inorganic filler;
  a plasticizing system comprising:
    according to a content A of between 10 and 60 phr, a thermoplastic hydrocarbon resin exhibiting a Tg of greater than 20° C.;
    according to a content B of between 10 and 60 phr, a liquid plasticizing agent;
    it being understood that the total content A+B is greater than 50 phr.

The tyres of the invention are intended in particular to equip motor vehicles of the passenger type, including 4×4 (four-wheel drive) vehicles and SUV vehicles (Sport Utility Vehicles), two-wheel vehicles (in particular motorcycles), and also industrial vehicles chosen especially from vans and heavy-duty vehicles, such as buses and heavy road transport vehicles, such as lorries.

The invention and its advantages will be readily understood in the light of the description and the implementational examples which follow.

I. DETAILED DESCRIPTION OF THE INVENTION

In the present description, unless expressly indicated otherwise, all the percentages (%) shown are percentages by weight.

The abbreviation "phr" means parts by weight per hundred parts of elastomer or rubber (of the total of the elastomers, if several elastomers are present).

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

All the values for glass transition temperature "Tg" are measured in a known manner by DSC (Differential Scanning calorimetry) according to Standard ASTM D3418 (1999).

"Diene" elastomer (or without distinction rubber) is understood to mean an elastomer resulting at least in part (that is to say, a homopolymer or a copolymer) from diene monomer(s) (i.e., monomers carrying two conjugated or non-conjugated carbon-carbon double bonds). "Isoprene elastomer" is understood to mean an isoprene homopolymer or copolymer, in other words a diene elastomer selected from the group consisting of natural rubber (NR), synthetic polyisoprenes (IRs), various isoprene copolymers and the mixtures of these elastomers.

The tyre of the invention thus has the essential characteristic that its tread comprises a rubber composition comprising at least a copolymer based on styrene and butadiene, a particularly high content of reinforcing inorganic filler and a specific plasticizing system, which components will be described in detail below.

I-1 Copolymer Based on Styrene and Butadiene

Copolymer based on styrene and butadiene is understood here to mean a copolymer of at least one styrene monomer and of at least one butadiene monomer (and, of course, also any mixture of such copolymers); in other words, the said copolymer based on styrene and butadiene comprises, by definition, at least styrene units (resulting from the styrene monomer) and butadiene units (resulting from the butadiene monomer).

Preferably, the content of the said copolymer in the tread composition is within a range from 60 to 100 phr, in particular within a range from 70 to 100 phr.

The following are suitable in particular as butadiene monomers: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, or an aryl-1,3-butadiene. The following are suitable in particular as styrene monomers: styrene, methylstyrenes, para(tert-butyl)styrene, methoxystyrenes or chlorostyrenes.

The said copolymer based on styrene and butadiene can have any microstructure, which depends on the polymerization conditions used, in particular on the presence or absence of a modifying and/or randomizing agent and on the amounts of modifying and/or randomizing agent employed. It can, for example, be a block, statistical, sequential or microsequential copolymer and can be prepared in dispersion or in solution; it can be coupled and/or star-branched or else functionalized with a coupling and/or star-branching or functionalization agent. Mention may be made, for example, of silanol or polysiloxane functional groups having a silanol end (such as described, for example, in EP 0 778 311 or U.S. Pat. No. 6,013,718), alkoxysilane groups (such as described, for example, in EP 0 890 607, U.S. Pat. No. 5,977,238 or WO 2009/133068), carboxyl groups (such as described in U.S. Pat. No. 6,815,473 or US 2006/0089445) or also polyether groups (such as described, for example, in U.S. Pat. No. 6,503,973).

According to a specific embodiment of the invention, use is made, for example, of a copolymer based on styrene and butadiene, in particular an SBR, which carries at least one (that is to say, one or more) SiOR functional group, R being hydrogen or a hydrocarbon radical preferably comprising from 1 to 4 carbon atoms, in particular a methyl or an ethyl. This SiOR functional group can be located at an end of the elastomer chain, even inside the elastomer chain or also as a pendant group along the elastomer chain; in the case where there are several SiOR functional groups borne by the copolymer, they can occupy one or other of the configurations. Of course, the above copolymer, in particular SBR, can be a mixture of a first copolymer bearing a silanol functional group and of a second copolymer bearing an SiOR functional group (with R a hydrocarbon radical), in particular an alkoxysilane functional group.

Preferably, the copolymer based on styrene and butadiene is a styrene/butadiene copolymer (abbreviated to SBR), it being possible for this SBR to be an emulsion SBR or ESBR (that is to say, prepared by emulsion polymerization), a solution SBR or SSBR (that is to say, prepared by solution polymerization) or a mixture of the two.

Mention may in particular be made, among copolymers based on styrene and butadiene, especially SBR, of those having a styrene content of between 5% and 60% by weight and more particularly between 20% and 50%, a content (mol %) of 1,2-bonds of the butadiene part of between 4% and 75%, and a content (mol %) of trans-1,4-bonds of between 10% and 80%.

Preferably, the Tg of the copolymer based on styrene and butadiene, in particular SBR (ESBR or SSBR), is between 0° C. and −80° C., more particularly between 0° C. and −70° C.; according to a specific embodiment, the Tg is between −5° C. and −60° C., in particular within a range from −10° C. to −50° C. A person skilled in the art knows how to modify the microstructure of a copolymer based on styrene and butadiene, in particular of an SBR, in order to increase and adjust its Tg, in particular by varying the contents of styrene, of 1,2-bonds or of trans-1,4-bonds of the butadiene part.

The above copolymer based on styrene and butadiene can optionally be combined with at least one second diene elastomer different from the said copolymer (that is to say, not comprising units resulting from styrene and butadiene), the said optional second diene elastomer being present at a content by weight which is consequently at most equal to 50 phr, preferably at most equal to 40 phr, in particular at most equal to 30 phr (as a reminder, phr meaning parts by weight per hundred parts of elastomer, that is to say of the total of the elastomers present in the tread).

This optional second diene elastomer is preferably chosen from the group consisting of polybutadienes (BRs), natural rubber (NR), synthetic polyisoprenes (IRs), butadiene copolymers (other than copolymers based on styrene and butadiene), isoprene copolymers and the mixtures of these elastomers.

The following are suitable in particular among polybutadienes or butadiene copolymers: polybutadienes having a content (mol %) of 1,2-units of between 4% and 80% or those having a content (mol %) of cis-1,4-units of greater than 80%, more particularly of greater than 90%, butadiene/isoprene copolymers and especially those having an isoprene content of between 5% and 90% by weight and a Tg of from −40° C. to −80° C., or isoprene/styrene copolymers and especially those having a styrene content of between 5% and 50% by weight and a Tg of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

Mention will in particular be made, among isoprene elastomers (i.e., isoprene homopolymers or copolymers), of NR, IR or isoprene copolymers, such as isobutene/isoprene (butyl rubber or IIR), isoprene/styrene (SIR), isoprene/butadiene (BIR) or isoprene/butadiene/styrene (SBIR) copolymers. The isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

The diene elastomers described above might also, in a predominant amount, be combined with synthetic elastomers other than diene elastomers, indeed even polymers other than elastomers, for example thermoplastic polymers.

1-2. Reinforcing Filler

The rubber composition of the tread of the tyre in accordance with the invention has as other essential characteristic that of comprising a reinforcing inorganic filler in a specific amount, in a proportion of from 100 to 150 phr.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 03/16387. Mention will also be made, as reinforcing inorganic filler, of mineral fillers of the aluminous type, in particular alumina ($Al_2O_3$) or aluminium (oxide)hydroxides, or else reinforcing titanium oxides.

According to a preferred embodiment of the invention, the reinforcing inorganic filler comprises from 50% to 100% by weight of silica; in other words, the silica represents from 50% to 100% by weight of the reinforcing inorganic filler.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. Mention may be made, by way of example, for example, of carbon blacks for tyres, such as described, for example, in patent documents WO 96/37547 and WO 99/28380.

The content of reinforcing inorganic filler, in particular of silica, is preferably greater than 100 phr and less than 150 phr, more preferably within a range from 105 to 145 phr, in particular from 110 to 140 phr.

According to an advantageous embodiment, the composition of the tread can comprise carbon black. The carbon black, when it is present, is preferably used at a content of less than 20 phr, more preferably of less than 10 phr (for example between 0.5 and 20 phr, in particular between 2 and 10 phr). Within the intervals indicated, benefit is derived from the colouring properties (black pigmenting agent) and UV-stabilizing properties of the carbon blacks without, moreover, penalizing the performances introduced by the reinforcing inorganic filler.

In order to couple the reinforcing inorganic filler to the diene elastomer, use is made, in a known way, of a coupling agent (or bonding agent) intended to provide a satisfactory connection, of chemical and/or physical nature, between the inorganic filler (surface of its particles) and the diene elastomer. This coupling agent is at least bifunctional. Use is made in particular of at least bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Particularly suitable, without the definition below being limiting, are silane polysulphides corresponding to the following general formula (I):

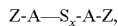
    Z-A-S$_x$-A-Z,    (I) in which:

x is an integer from 2 to 8 (preferably from 2 to 5);
the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene);
the Z symbols, which are identical or different, correspond to one of the three formulae below:

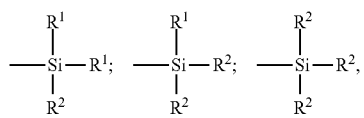

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula [($C_2H_5O$)$_3$Si($CH_2$)$_3$$S_2$]$_2$, or bis(triethoxysilylpropyl)disulphide, abbreviated to TESPD, of formula [($C_2H_5O$)$_3$Si($CH_2$)$_3$S]$_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in the abovementioned Patent Application WO 02/083782 (or U.S. Pat. No. 7,217,751).

Mention will in particular be made, as examples of coupling agents other than an alkoxysilane polysulphide, of bifunctional POSs (polyorganosiloxanes), or else of hydroxysilane polysulphides ($R^2$=OH in the above formula I), such as described, for example, in Patent Applications WO 02/30939 (or U.S. Pat. No. 6,774,255), WO 02/31041 (or US 2004/051210) and WO 2007/061550, or else of silanes or POSs bearing azodicarbonyl functional groups, such as described, for example, in Patent Applications WO 2006/125532, WO 2006/125533 and WO 2006/125534.

Mention will be made, as examples of other silane sulphides, for example, of the silanes bearing at least one thiol (—SH) functional group (referred to as mercaptosilanes) and/or at least one masked thiol functional group, such as described, for example, in patents or patent applications U.S. Pat. No. 6,849,754, WO 99/09036, WO 2006/023815, WO 2007/098080, WO 2008/055986 and WO 2010/072685.

Of course, use might also be made of mixtures of the coupling agents described above, as described in particular in the abovementioned Application WO 2006/125534.

The content of coupling agent is preferably between 2 and 20 phr, more preferably between 3 and 15 phr.

I-3. Plasticizing system

Another essential characteristic of the rubber composition of the tread of the tyre in accordance with the invention is to comprise a specific plasticizing system comprising, on the one hand, according to a content A of between 10 and 60 phr, a thermoplastic hydrocarbon resin exhibiting a Tg of greater than 20° C. and, on the other hand, according to a content B of between 10 and 60 phr, a liquid plasticizer, it being understood that the total content A+B is greater than 50 phr. Preferably, the content A is between 10 and 50 phr and the content B is between 10 and 50 phr.

According to another preferred embodiment, the total content A+B is between 50 and 100 phr, more preferably between 50 and 80 phr, in particular between 50 and 70 phr.

According to another specific embodiment of the invention, the ratio of A to B is between 1:5 and 5:1 (that is, between 0.2 and 5.0), more preferably between 1:4 and 4:1 (that is, between 0.25 and 4.0).

Moreover and preferably, the ratio by weight of (A+B) to the weight of reinforcing inorganic filler, in particular of silica, is between 35% and 70%, more preferably within a range from 40% to 60%.

The designation "resin" is reserved in the present patent application, by definition, for a compound which is solid at ambient temperature (23° C.), in contrast to a liquid plasticizing agent, such as an oil.

Hydrocarbon resins are polymers well known to a person skilled in the art, essentially based on carbon and hydrogen but being able to comprise other types of atoms, which can be used in particular as plasticizing agents or tackifying agents in polymer matrices. They are by nature miscible (i.e., compatible) at the contents used with the polymer compositions for which they are intended, so as to act as true diluents. They have been described, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tyre rubber field (5.5. *"Rubber Tires and Mechanical Goods"*). They can be aliphatic, cycloaliphatic, aromatic, hydrogenated aromatic, of the aliphatic/aromatic type, that is to say based on aliphatic and/or aromatic monomers. They can be natural or synthetic, based or not based on petroleum (if such is the case, also known under the name of petroleum resins). Their Tg is preferably greater than 0° C., in particular greater than 20° C. (generally between 30° C. and 95° C.).

In a known way, these hydrocarbon resins can also be described as thermoplastic resins in the sense that they soften when heated and can thus be moulded. They can also be defined by a softening point or temperature. The softening point of a hydrocarbon resin is generally greater by approximately 50 to 60° C. than its Tg value. The softening point is measured according to Standard ISO 4625 (Ring and Ball method). The macrostructure (Mw, Mn and PI) is determined by size exclusion chromatography (SEC) as indicated below.

As a reminder, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran, at a concentration of 1 g/liter. The solution is then filtered through a filter with a porosity of 0.45 μm, before injection into the apparatus. The apparatus used is, for example, a "Waters Alliance" chromatographic line according to the following conditions: elution solvent: tetrahydrofuran; temperature 35° C.; concentration 1 g/liter; flow rate: 1 ml/min; volume injected: 100 μA; Moore calibration with polystyrene standards; set of 3 "Waters" columns in series ("Styragel HR4E", "Styragel HR1" and "Styragel HR 0.5"); detection by differential refractometer (for example, "Waters 2410") which can be equipped with operating software (for example, "Waters Millenium").

A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses). All the values for molar masses shown in the present patent application are thus relative to calibration curves produced with polystyrene standards.

According to a preferred embodiment of the invention, the hydrocarbon resin exhibits at least any one, more preferably all, of the following characteristics:
- a Tg of greater than 25° C. (in particular between 30° C. and 100° C.), more preferably of greater than 30° C. (in particular between 30° C. and 95° C.);
- a softening point of greater than 50° C. (in particular between 50° C. and 150° C.);
- a number-average molar mass (Mn) of between 400 and 2000 g/mol, preferably between 500 and 1500 g/mol;
- a polydispersity index (PI) of less than 3, preferably of less than 2 (as a reminder: PI=Mw/Mn with Mw the weight-average molar mass).

Mention may be made, as examples of such hydrocarbon resins, of those selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and the mixtures of these resins. Mention may more particularly be made, among the above copolymer resins, of those selected from the group consisting of (D)CPD/vinylaromatic copolymer resins, (D)CPD/terpene copolymer resins, terpene/phenol copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins and the mixtures of these resins.

The term "terpene" combines here, in a known way, alpha-pinene, beta-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomers are, for example: styrene, α-methylstyrene, ortho-methylstyrene, meta-methylstyrene, para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

All the above resins are well known to a person skilled in the art and are commercially available, for example sold by DRT under the name Dercolyte as regards polylimonene resins, sold by Neville Chemical Company under the name Super Nevtac, by Kolon under the name Hikorez or by Exxon Mobil under the name Escorez as regards $C_5$ fraction/styrene resins or $C_5$ fraction/$C_9$ fraction resins, or else by Struktol under the name 40 MS or 40 NS (mixtures of aromatic and/or aliphatic resins).

The plasticizing system moreover comprises a plasticizer which is liquid (at 23° C.), the function of which is to soften the matrix by diluting the elastomer and the reinforcing filler; its Tg is preferably less than −20° C., more preferably less than −40° C.

Any extending oil, whether of aromatic or non-aromatic nature, any liquid plasticizing agent known for its plasticizing properties with regard to diene elastomers, can be used. At ambient temperature (23° C.), these plasticizers or these oils, which are more or less viscous, are liquids (that is to say, as a reminder, substances which have the ability to eventually take on the shape of their container), as opposed, in particular, to plasticizing hydrocarbon resins which are by nature solid at ambient temperature.

Liquid plasticizing agents selected from the group consisting of liquid diene polymers, polyolefin oils, naphthenic oils, paraffinic oils, DAE (Distillate Aromatic Extracts) oils, MES (Medium Extracted Solvates) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, vegetable oils, ether plasticizers, ester plasticizers, phosphate plasticizers, sulphonate plasticizers and the mixtures of these compounds are particularly suitable. According to a more preferred embodiment, the liquid plasticizing agent is selected from the group consisting of MES oils, TDAE oils, naphthenic oils, vegetable oils and the mixtures of these oils.

According to a preferred embodiment of the invention, the liquid plasticizer, in particular petroleum oil, is of the non-aromatic type. A liquid plasticizer is described as non-aromatic when it exhibits a content of polycyclic aromatic compounds, determined with the extract in DMSO according to the IP 346 method, of less than 3% by weight, with respect to the total weight of the plasticizer. Therefore, use may preferably be made of a liquid plasticizing agent selected from the group consisting of MES oils, TDAE oils, naphthenic oils (of low or high viscosity, in particular hydrogenated or non-hydrogenated), paraffinic oils and the mixtures of these oils. RAE oils, TRAE oils and SRAE oils or the mixtures of these oils, which contain low contents of polycyclic compounds, are also suitable as petroleum oil.

According to another specific embodiment, the liquid plasticizer is a terpene derivative; mention may in particular be made, as example, of the product Dimarone from Yasuhara.

The liquid polymers resulting from the polymerization of olefins or dienes, such as, for example, those selected from the group consisting of polybutenes, polydienes, in particular polybutadienes, polyisoprenes, copolymers of butadiene and isoprene, copolymers of butadiene or isoprene and styrene, and the mixtures of these liquid polymers, are also suitable. The number-average molar mass of such liquid polymers is preferably within a range extending from 500 g/mol to 50 000 g/mol, more preferably from 1000 g/mol to 10 000 g/mol. Mention may in particular be made, by way of example, of the Ricon products from Sartomer.

According to another preferred embodiment of the invention, the liquid plasticizer is a vegetable oil. Use is preferably made of an oil selected from the group consisting of linseed, safflower, soybean, maize, cottonseed, rapeseed, castor, tung, pine, sunflower, palm, olive, coconut, peanut and grapeseed oils, and the mixtures of these oils, in particular a sunflower oil. This vegetable oil, in particular sunflower oil, is more preferably an oil rich in oleic acid, that is to say that the fatty acid (or all of the fatty acids, if several are present) from which it derives comprises oleic acid according to a fraction by weight at least equal to 60%, more preferably at least equal to 70%, in particular equal to or greater than 80%.

According to another specific embodiment of the invention, the liquid plasticizer is an ether; mention may be made, for example, of polyethylene glycols or polypropylene glycols.

The liquid plasticizers selected from the group consisting of ester plasticizers, phosphate plasticizers, sulphonate plasticizers and the mixtures of these compounds are also suitable. The triesters selected from the group consisting of triesters of carboxylic acid, of phosphoric acid or of sulphonic acid and the mixtures of these triesters are suitable in particular. Mention may in particular be made, as examples of carboxylic acid ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among triesters, of glycerol triesters, preferably predominantly composed (for more than 50% by weight, more preferably for more than 80% by weight) of an unsaturated $C_{18}$ fatty acid, that is to say selected from the group consisting of oleic acid, linoleic acid, linolenic acid and the mixtures of these acids; more preferably, whether it is of synthetic or natural origin, the fatty acid used is composed, for more than 60% by weight, more preferably still for more than 70% by weight, of oleic acid; such triesters (trioleates) having a high content of oleic acid, of natural or synthetic origin, are well known; they have been described, for example, in Application WO 02/088238, as plasticizing agents in treads for tyres. Mention may be made, as phosphate plasticizers, for example, of those which comprise between 12 and 30 carbon atoms, for example trioctyl phosphate.

1-4. Various Additives

The rubber compositions of the treads of the tyres in accordance with the invention can also comprise all or a portion of the usual additives generally used in elastomer compositions intended for the manufacture of treads for tyres, fillers other than those mentioned above, for example non-reinforcing fillers, such as chalk, or else lamellar fillers, such as kaolin or talc, pigments, protective agents, such as antiozone waxes, chemical antiozonants or antioxidants, reinforcing resins (such as resorcinol or bismaleimide), methylene acceptors (for example, phenolic novolak resin) or methylene donors (for example, HMT or H3M), as described, for example, in Application WO 02/10269, a crosslinking system based either on sulphur, or on sulphur donors and/or on peroxide and/or on bismaleimides, vulcanization accelerators or vulcanization retarders, or vulcanization activators.

These compositions can also comprise coupling activators when a coupling agent is used, agents for covering the inorganic filler or more generally processing aids capable, in a known way, by virtue of an improvement in the dispersion of the filler in the rubber matrix and of a lowering of the viscosity of the compositions, of improving their ability to be processed in the raw state; these agents are, for example, hydrolysable silanes, such as alkylalkoxysilanes, polyols, polyethers, amines, or hydroxylated or hydrolysable polyorganosiloxanes.

1-5. Preparation of the Rubber Compositions

The compositions used in the treads of the tyres of the invention can be manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following stages:
  thermomechanically kneading (for example in one or more goes) the diene elastomer or elastomers with the reinforcing inorganic filler, the coupling agent, if appropriate the carbon black, and the plasticizing system, until a maximum temperature of between 110° C. and 190° C. is reached ("non-productive" phase);
  cooling the combined mixture to a temperature of less than 100° C.;
  subsequently incorporating, during a second stage ("productive" stage), a crosslinking system;
  kneading everything up to a maximum temperature of less than 110° C.

By way of example, the non-productive phase is carried out in a single thermomechanical stage during which, in a first step, all the base constituents (the diene elastomer(s), the plasticizing system, the reinforcing inorganic filler and the coupling agent) are introduced into an appropriate mixer, such as a standard internal mixer, followed, in a second step, for example after kneading for one to two minutes, by the other additives, optional additional filler-covering agents or processing aids, with the exception of the crosslinking system. The total duration of the kneading, in this non-productive phase, is preferably between 1 and 15 min.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The crosslinking system proper is preferably based on sulphur and on a primary vulcanization accelerator, in particular on an accelerator of the sulphenamide type. Various known secondary vulcanization accelerators or vulcanization activators, such as zinc oxide, stearic acid, guanidine derivatives (in particular diphenylguanidine), and the like, come to be added to this vulcanization system, being incorporated during the first non-productive phase and/or during the productive phase. The sulphur content is preferably between 0.5 and 3.0 phr and the content of the primary accelerator is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and their derivatives and accelerators of the thiuram and zinc dithiocarbamate types. These accelerators are more preferably selected from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSP"), zinc dibenzyldithiocarbamate (abbreviated to "ZBEC") and the mixtures of these compounds. Preferably, a primary accelerator of the sulphenamide type is used.

The final composition thus obtained can subsequently be calendered, for example in the form of a sheet or of a plaque, in particular for laboratory characterization, or also extruded, for example to form a rubber profiled element used in the manufacture of a tyre tread, in particular for a passenger vehicle.

The invention also applies to the cases where the rubber compositions described above form only a portion of treads of the composite or hybrid type, in particular those consisting of two radially superimposed layers of different formulations ("cap-base" structure), both being patterned and intended to come into contact with the road when the tyre is rolling, during the life of the latter. The base part of the formulation described above can then constitute the radially outer layer of the tread intended to come into contact with the ground from the moment when the new tyre starts rolling, or on the other hand its radially inner layer intended to come into contact with the ground at a later stage.

According to a specific embodiment, the Shore A hardness of the rubber composition according to the invention is within a range extending from 60 to 75; the Shore A hardness of the compositions after curing is assessed in accordance with Standard ASTM D 2240-86.

The invention relates to the tyres described above, both in the raw state (that is to say, before curing) and in the cured state (that is to say, after crosslinking or vulcanization).

II. EXAMPLES OF THE IMPLEMENTATION OF THE INVENTION

II.1—Preparation of the Compositions

The following tests are carried out in the following way: the elastomers, the silica, the coupling agent, the plasticizers and also the various other ingredients, with the exception of the vulcanization system, are successively introduced into an internal mixer (final degree of filling: approximately 70% by volume), the initial vessel temperature of which is approximately 60° C. Thermomechanical working (non-productive phase) is then carried out in one stage, which lasts in total 5 min, until a maximum "dropping" temperature of 165° C. is reached. The mixture thus obtained is recovered and cooled and then sulphur and an accelerator of sulphenamide type are incorporated on a mixer (homofinisher) at 23° C., everything being mixed (productive phase) for an appropriate time (for example between 5 and 12 min).

The compositions are finally extruded in the form of a tread for a passenger vehicle tyre, in order to be tested as indicated in the following section.

II.2—Tests on Tyres

Test A

For the requirements of this first test, two rubber compositions (denoted A-1 and A-2 below) were prepared, the formulations of which are given in Table 1, the contents of the different products being expressed in phr (parts by weight per hundred parts of total elastomer).

The control composition (A-1) is a conventional composition for a "Green Tyre" having a low rolling resistance, with a formulation well-known to a person skilled in the art, based on a blend of synthetic BR and SBR elastomers (silanol-functionalized solution SBR, such as described in the abovementioned patent EP 0 778 311), comprising 85 phr of reinforcing inorganic filler (silica), a coupling agent and, as plasticizing system, on the one hand 15 phr of liquid plasticizing agent (vegetable oil) and, on the other hand, 10 phr of thermoplastic resin ($C_5/C_9$ copolymer resin); in this control composition, the plasticizer total is thus equal to 25 phr.

The composition according to the invention (A-2) is identical to the control composition (A-1), apart from the differences that its content of reinforcing inorganic filler is significantly increased, to a value of greater than 100 phr, and that it comprises, on the one hand, 33 phr of liquid plasticizing agent (vegetable oil+TDAE oil) and, on the other hand, 20 phr of thermoplastic resin ($C_5/C_9$ resin); in this composition according to the invention, the total (A+B) of plasticizing system, greater than 50 phr, is thus very markedly increased with respect to the control composition.

These compositions A-1 and A-2 are used as treads for radial carcass passenger vehicle tyres, respectively denoted P-1 (control tyres) and P-2 (tyres according to the invention), with dimensions of 225/55R16, which are conventionally manufactured and which are in all respects identical apart from the constituent rubber compositions of their treads.

The tyres are fitted, at the front and at the rear, under nominal inflation pressure, to a motor vehicle of the "BMW" make, "530" model, equipped with an ABS system.

The tyres are subsequently subjected to a braking test on wet ground at 10° C. which consists in measuring the distance needed to go from 80 km/h to 10 km/h during sudden braking on sprayed ground (bituminous concrete). A value greater than that of the control, arbitrarily set at 100, indicates an improved result, that is to say a shorter braking distance.

The results obtained are shown in the appended Table 2. It is found, unexpectedly, that the braking performance on wet ground is very markedly improved, by approximately 10%: this result corresponds, in this test, to a braking distance shortened by approximately 4 meters, thus quite significantly.

Test B

For the requirements of this second test, two other rubber compositions (denoted B-1 and B-2) were prepared, the formulations of which are given in Table 3.

The control composition (B-1) is another conventional composition for a "Green Tyre" having a low rolling resistance, based on BR and SBR, comprising 80 phr of silica, a coupling agent and, as plasticizer, 15 phr of liquid plasticizing agent (MES oil) and 20 phr of thermoplastic resin (polylimonene resin), i.e., a plasticizer total A+B equal to 35 phr. For its part, the composition according to the invention (B-2) uses 100 phr of SBR copolymer (SBR prepared in solution and functionalized with alkoxysilane, according to WO 2009/133068); in addition, it differs from the control composition B-1 in its higher content of reinforcing inorganic filler, greater than 100 phr, and in a plasticizing system total (A+B) which is very markedly increased (since virtually doubled) with respect to the control composition (B-1).

These compositions B-1 and B-2 are used as treads for radial carcass passenger vehicle tyres, respectively denoted P-1 (control tyres) and P-2 (tyres according to the invention), with dimensions of 205/55R16, which are conventionally manufactured and which are in all respects identical apart from the constituent rubber compositions of their treads.

As above, the tyres are fitted, at the front and at the rear, under nominal inflation pressure, to a motor vehicle of the "Volkswagen" make, "Golf 6" model, equipped with an ABS system.

The tyres are then subjected to another wet grip test, which consists this time in measuring the minimum time necessary for the vehicle to travel, under limit speed conditions, a circuit with a great many bends and which is sprayed so as to keep the ground wet. A value greater than that of the control, arbitrarily set at 100, indicates an improved result, that is to say a shorter travel time.

The rolling resistance is also measured on a rolling drum, according to the ISO 87-67 (1992) method. A value greater than that of the control, arbitrarily set at 100, indicates an improved result, that is to say a lower rolling resistance.

The results obtained are shown in the appended Table 4.

It is found, surprisingly, that the tyres of the invention (P-2) make it possible to very substantially improve the wet grip performance, with a travel time reduced by 5% (i.e., 5 seconds less for a circuit lap lasting approximately 100 seconds) with respect to the control tyres (P-1), which is very significant for such a test. Moreover, which is noteworthy, it is noted that this result is obtained without damaging the rolling resistance.

In conclusion, the tyres in accordance with the invention exhibit a wet grip performance which is greatly improved by virtue of the specific formulation of their tread, combining in particular particularly high contents of reinforcing inorganic filler and of plasticizing system.

TABLE 1

| Composition No. | A-1 | A-2 |
| --- | --- | --- |
| BR (1) | 20 | 20 |
| SBR (2) | 80 | 80 |
| Silica (3) | 85 | 120 |
| Coupling agent (4) | 6.8 | 9.6 |
| Carbon black (5) | 3 | 3 |
| Liquid plasticizer (6) |  | 8 |
| Liquid plasticizer (7) | 15 | 25 |
| Plasticizing resin (8) | 10 | 20 |
| Total plasticizer | 25 | 53 |
| Stearic acid | 2 | 2 |
| Antiozone wax | 1.5 | 1.5 |
| Antioxidant (9) | 2 | 2 |
| DPG (10) | 1.6 | 1.6 |
| ZnO | 1.3 | 1.3 |
| Accelerator (11) | 1.6 | 1.6 |
| Sulphur | 1 | 1 |

(1) BR with 4% of 1,2- units and 93% of cis-1,4- units (Tg = −106° C.);
(2) SBR: Solution SBR (silanol-functionalized) with 44% of styrene units and 41% of 1,2- units of the butadiene part (Tg = −12° C.);
(3) Zeosil 1165 MP silica from Rhodia (HDS type);
(4) TESPT coupling agent (Si69 from Degussa);
(5) ASTM grade N234 (Cabot);
(6) TDAE oil (Vivatec 500 from Klaus Dahleke);
(7) Sunflower oil comprising 85% by weight of oleic acid (Lubrirob Tod 1880 from Novance);
(8) $C_5/C_9$ resin (Escorez ECR-373 from Exxon);
(9) N-(1,3-Dimethylbutyl)-N'-phenyl-p-phenylenediamine, from Flexsys;
(10) Diphenylguanidine (Perkacit DPG from Flexsys);
(11) N-Dicyclohexyl-2-benzothiazolesulphenamide (Santocure CBS from Flexsys).

TABLE 2

| Tyre | P-1 | P-2 |
| --- | --- | --- |
| Braking on wet ground | 100 | 111 |

TABLE 3

| Composition No. | B-1 | B-2 |
| --- | --- | --- |
| BR (1) | 25 | — |
| SBR (2) | 75 | — |
| SBR (3) | — | 100 |
| Silica (4) | 80 | 110 |

TABLE 3-continued

| Composition No. | B-1 | B-2 |
|---|---|---|
| Coupling agent (5) | 6.4 | 8.8 |
| Carbon black (6) | 3 | 3 |
| Liquid plasticizer (7) | 15 | — |
| Liquid plasticizer (8) | — | 15 |
| Plasticizing resin (9) | 20 | 45 |
| Total plasticizer | 35 | 60 |
| Stearic acid | 2 | 2 |
| Antiozone wax | 1.8 | 1.8 |
| Antioxidant (10) | 2.6 | 2.6 |
| DPG (11) | 1.8 | 1.8 |
| ZnO | 1.2 | 1.2 |
| Accelerator (12) | 2.3 | 2.3 |
| Sulphur | 1 | 1 |

(1) BR with 4% of 1,2- units and 93% of cis-1,4- units (Tg = −106° C.);
(2) Solution SBR with 25% of styrene units and 58% of 1,2- units of the butadiene part (Tg = −24° C.);
(3) Solution SBR (alkoxysilane-functionalized) with 27% of styrene units and 24% of 1,2- units of the butadiene part (Tg = −48° C.);
(4) Zeosil 1165 MP silica from Rhodia (HDS type);
(5) TESPT coupling agent (Si69 from Degussa);
(6) ASTM grade N234 (Cabot);
(7) MES oil (Catenex SNR from Shell);
(8) Sunflower oil comprising 85% by weight of oleic acid (Lubrirob Tod 1880 from Novance);
(9) Polylimonene resin (Dercolyte L120 from DRT);
(10) N-(1,3-Dimethylbutyl)-N'-phenyl-p-phenylenediamine (Flexsys);
(11) Diphenylguanidine (Perkacit DPG from Flexsys);
(12) N-Dicyclohexyl-2-benzothiazolesulphenamide (Santocure CBS from Flexsys).

TABLE 4

| Tyre | P-1 | P-2 |
|---|---|---|
| Wet grip | 100 | 105 |
| Rolling resistance | 100 | 100 |

The invention claimed is:

1. A tire comprising a tread formed of at least a rubber composition, wherein the rubber composition includes:
    from 50 to 100 phr of a copolymer elastomer based on styrene and butadiene;
    from 100 to 150 phr of a reinforcing inorganic filler;
    less than 8 phr of carbon black; and
    a plasticizing system that includes:
        a content A of between 10 and 60 phr of a thermoplastic hydrocarbon resin exhibiting a Tg of greater than 20° C., and
        a content B of between 10 and 60 phr of a liquid plasticizing agent,
    wherein a total content A+B is greater than 50 phr, and
    wherein a weight ratio of a weight of the total content A+B to a weight of the reinforcing inorganic filler is between 35% and 70%.

2. The tire according to claim 1, wherein the rubber composition further includes:
    from 0 to 50 phr of a second elastomer that includes a diene elastomer.

3. The tire according to claim 2, wherein the second elastomer is selected from the group consisting of polybutadienes, natural rubber, synthetic polyisoprenes, butadiene copolymers, isoprene copolymers, and mixtures thereof.

4. The tire according to claim 3, wherein the second elastomer is a polybutadiene.

5. The tire according to claim 3, wherein the second elastomer is natural rubber or a synthetic polyisoprene.

6. The tire according to claim 1, wherein the copolymer elastomer is a styrene/butadiene copolymer elastomer.

7. The tire according to claim 1, wherein the rubber composition includes the copolymer elastomer in a range extending from 60 to 100 phr.

8. The tire according to claim 7, wherein the rubber composition includes the copolymer elastomer in a range extending from 70 to 100 phr.

9. The tire according to claim 1, wherein the rubber composition includes the reinforcing inorganic filler in a range extending from 105 to 145 phr.

10. The tire according to claim 9, wherein the rubber composition includes the reinforcing inorganic filler in a range extending from 110 to 140 phr.

11. The tire according to claim 1, wherein the reinforcing inorganic filler includes from 50% to 100% by weight of silica.

12. The tire according to claim 1, wherein the content A is between 10 and 50 phr, and wherein the content B is between 10 and 50 phr.

13. The tire according to claim 1, wherein the total content A+B is between 50 and 100 phr.

14. The tire according to claim 13, wherein the total content A+B is between 50 and 80 phr.

15. The tire according to claim 1, wherein a ratio of the content A to the content B is between 1:5 and 5:1.

16. The tire according to claim 15, wherein the ratio of the content A to the content B is between 1:4 and 4:1.

17. The tire according to claim 1, wherein the thermoplastic hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, α-methyl styrene homopolymer or copolymer resins, and mixtures thereof.

18. The tire according to claim 1, wherein the liquid plasticizing agent is selected from the group consisting of liquid diene polymers, polyolefin oils, naphthenic oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulphonate plasticizers, and mixtures thereof.

19. The tire according to claim 18, wherein the liquid plasticizing agent is selected from the group consisting of MES oils, TDAE oils, naphthenic oils, vegetable oils, and mixtures thereof.

20. The tire according to claim 1, wherein the weight ratio is within a range extending from 40% to 60%.

21. A tire comprising a tread formed of at least a rubber composition, wherein the rubber composition includes:
    from 50 to 100 phr of a copolymer elastomer based on styrene and butadiene;
    from 100 to 150 phr of a reinforcing inorganic filler;
    less than 10 phr of carbon black; and
    a plasticizing system that includes:
        a content A of between 10 and 60 phr of a thermoplastic hydrocarbon resin exhibiting a Tg of greater than 20° C., and
        a content B of between 10 and 60 phr of a liquid plasticizing agent,
    wherein a total content A+B is greater than 50 phr,
    wherein a weight ratio of a weight of the total content A+B to a weight of the reinforcing inorganic filler is between 35% and 70%, and
    wherein, if the composition comprises a polyisoprene, the polyisoprene has a cis-1,4-bond content of greater than 90 mol %.

22. The tire according to claim 21, wherein the rubber composition further includes:
from 0 to 50 phr of a second elastomer that includes a diene elastomer.

23. The tire according to claim 22, wherein the second elastomer is selected from the group consisting of polybutadienes, natural rubber, synthetic polyisoprenes, butadiene copolymers, isoprene copolymers, and mixtures thereof.

24. The tire according to claim 23, wherein the second elastomer is a polybutadiene.

25. The tire according to claim 23, wherein the second elastomer is natural rubber or a synthetic polyisoprene.

26. The tire according to claim 21, wherein the copolymer elastomer is a styrene/butadiene copolymer elastomer.

27. The tire according to claim 21, wherein the rubber composition includes the copolymer elastomer in a range extending from 60 to 100 phr.

28. The tire according to claim 27, wherein the rubber composition includes the copolymer elastomer in a range extending from 70 to 100 phr.

29. The tire according to claim 21, wherein the rubber composition includes the reinforcing inorganic filler in a range extending from 105 to 145 phr.

30. The tire according to claim 29, wherein the rubber composition includes the reinforcing inorganic filler in a range extending from 110 to 140 phr.

31. The tire according to claim 21, wherein the reinforcing inorganic filler includes from 50% to 100% by weight of silica.

32. The tire according to claim 21, wherein the content A is between 10 and 50 phr, and wherein the content B is between 10 and 50 phr.

33. The tire according to claim 21, wherein the total content A+B is between 50 and 100 phr.

34. The tire according to claim 33, wherein the total content A+B is between 50 and 80 phr.

35. The tire according to claim 21, wherein a ratio of the content A to the content B is between 1:5 and 5:1.

36. The tire according to claim 35, wherein the ratio of the content A to the content B is between 1:4 and 4:1.

37. The tire according to claim 21, wherein the thermoplastic hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, α-methylstyrene homopolymer or copolymer resins, and mixtures thereof.

38. The tire according to claim 21, wherein the liquid plasticizing agent is selected from the group consisting of liquid diene polymers, polyolefin oils, naphthenic oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulphonate plasticizers, and mixtures thereof.

39. The tire according to claim 38, wherein the liquid plasticizing agent is selected from the group consisting of MES oils, TDAE oils, naphthenic oils, vegetable oils, and mixtures thereof.

40. The tire according to claim 21, wherein the weight ratio is within a range extending from 40% to 60%.

41. A tire comprising a tread formed of at least a rubber composition, wherein the rubber composition includes:
from 50 to 100 phr of a copolymer elastomer based on styrene and butadiene;
from 100 to 150 phr of a reinforcing inorganic filler;
less than 8 phr of carbon black; and
a plasticizing system that includes:
a content A of between 10 and 60 phr of a thermoplastic hydrocarbon resin exhibiting a Tg of greater than 20° C., and
a content B of between 10 and 60 phr of a liquid plasticizing agent,
wherein a total content A+B is greater than 50 phr,
wherein a weight ratio of a weight of the total content A+B to a weight of the reinforcing inorganic filler is between 35% and 70%, and
wherein, if the composition comprises a polyisoprene, the polyisoprene has a cis-1,4-bond content of greater than 90 mol %.

42. The tire according to claim 41, wherein the rubber composition further includes:
from 0 to 50 phr of a second elastomer that includes a diene elastomer.

43. The tire according to claim 42, wherein the second elastomer is selected from the group consisting of polybutadienes, natural rubber, synthetic polyisoprenes, butadiene copolymers, isoprene copolymers, and mixtures thereof.

44. The tire according to claim 43, wherein the second elastomer is a polybutadiene.

45. The tire according to claim 43, wherein the second elastomer is natural rubber or a synthetic polyisoprene.

46. The tire according to claim 41, wherein the copolymer elastomer is a styrene/butadiene copolymer elastomer.

47. The tire according to claim 41, wherein the rubber composition includes the copolymer elastomer in a range extending from 60 to 100 phr.

48. The tire according to claim 47, wherein the rubber composition includes the copolymer elastomer in a range extending from 70 to 100 phr.

49. The tire according to claim 41, wherein the rubber composition includes the reinforcing inorganic filler in a range extending from 105 to 145 phr.

50. The tire according to claim 49, wherein the rubber composition includes the reinforcing inorganic filler in a range extending from 110 to 140 phr.

51. The tire according to claim 41, wherein the reinforcing inorganic filler includes from 50% to 100% by weight of silica.

52. The tire according to claim 41, wherein the content A is between 10 and 50 phr, and wherein the content B is between 10 and 50 phr.

53. The tire according to claim 41, wherein the total content A+B is between 50 and 100 phr.

54. The tire according to claim 53, wherein the total content A+B is between 50 and 80 phr.

55. The tire according to claim 41, wherein a ratio of the content A to the content B is between 1:5 and 5:1.

56. The tire according to claim 55, wherein the ratio of the content A to the content B is between 1:4 and 4:1.

57. The tire according to claim 41, wherein the thermoplastic hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, α-methyl styrene homopolymer or copolymer resins, and mixtures thereof.

58. The tire according to claim 41, wherein the liquid plasticizing agent is selected from the group consisting of liquid diene polymers, polyolefin oils, naphthenic oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulphonate plasticizers, and mixtures thereof.

59. The tire according to claim 58, wherein the liquid plasticizing agent is selected from the group consisting of MES oils, TDAE oils, naphthenic oils, vegetable oils, and mixtures thereof.

60. The tire according to claim 41, wherein the weight ratio is within a range extending from 40% to 60%.

* * * * *